(12) United States Patent
Babinowich et al.

(10) Patent No.: US 9,870,596 B2
(45) Date of Patent: Jan. 16, 2018

(54) PREDICTING COMMUNITY DEVELOPMENT TRENDS

(71) Applicant: International Business Machines Corporation, Armonk, NY (US)

(72) Inventors: Kyle R. Babinowich, New York, NY (US); Sailee S. Latkar, Secaucus, NJ (US); Joseph G. Schiavo, IV, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 14/490,010

(22) Filed: Sep. 18, 2014

(65) Prior Publication Data

US 2016/0086082 A1    Mar. 24, 2016

(51) Int. Cl.
*G06Q 50/16* (2012.01)

(52) U.S. Cl.
CPC .................................... *G06Q 50/16* (2013.01)

(58) Field of Classification Search
None
See application file for complete search history.

(56) References Cited

U.S. PATENT DOCUMENTS

| | | | |
|---|---|---|---|
| 7,640,196 B2 * | 12/2009 | Weiss ..................... | G06Q 30/02 705/35 |
| 8,583,562 B1 | 11/2013 | McDaniel et al. | |
| 2009/0088967 A1 * | 4/2009 | Lerner ................... | G01C 21/32 701/532 |
| 2012/0158748 A1 * | 6/2012 | Smintina ............ | G06Q 30/0623 707/748 |
| 2013/0073336 A1 | 3/2013 | Heath | |
| 2013/0073388 A1 | 3/2013 | Heath | |
| 2013/0201340 A1 | 8/2013 | Meadow et al. | |
| 2013/0346151 A1 * | 12/2013 | Bleakley ............. | G06Q 10/063 705/7.31 |
| 2014/0164260 A1 * | 6/2014 | Spieckerman ..... | G06Q 30/0278 705/306 |
| 2014/0372173 A1 * | 12/2014 | Koganti ................. | G06Q 50/16 705/7.31 |
| 2015/0213315 A1 * | 7/2015 | Gross ................. | G06Q 30/0643 382/159 |
| 2015/0302488 A1 * | 10/2015 | Wilson .................. | G06Q 30/02 705/306 |

FOREIGN PATENT DOCUMENTS

WO    2008060440 A2    5/2008

OTHER PUBLICATIONS

Morelli et al., "IBM SPSS predictive analytics: Optimizing decisions at the point of impact", IBM, Redbooks, © Copyright IBM Corp. 2010.

(Continued)

*Primary Examiner* — Alan Chen
(74) *Attorney, Agent, or Firm* — Stephen R. Yoder; Maeve M. Carpenter (57) ABSTRACT

Community development is supported by a community rating. Community ratings for various communities are compared to identify a preferred community. Historical community ratings are determined for the preferred community. Community rating trends are identified for the community and these trends are used for predicting future community rating(s) to support development decisions.

18 Claims, 5 Drawing Sheets

(56) References Cited

OTHER PUBLICATIONS

Motorola, Inc. et al., "Real Estate Icon Placement", An IP.com Prior Art Database Technical Disclosure, Published Apr. 15, 2008, IP.com No. IPCOM000169417D, Copyright © 2008, Motorola Inc.

Rinner et al., "The Spatial Dimensions of Multi-Criteria Evaluation—Case Study of a Home Buyer's Spatial Decision Support System", Department of Geography, Ryerson University, M. Raubal et al. (Eds.), GIScience 2006, LNCS 4197, pp. 338-352, © Springer-Verlag Berlin Heidelberg 2006.

SPI DST et al., "The effects of environmental technology on real estate development—How to increase asset value through the implementation of innovative environmental technology", An IP.com Prior Art Database Technical Disclosure, Original Publication Dec. 31, 1998, IP.com No. IPCOM000128045D, IP.com Electronic Publication Sep. 14, 2005.

"Method to use a GPS to locate ideal real-estate or touring areas in a previously unfamiliar location", An IP.com Prior Art Database Technical Disclosure, Authors Disclosed Anonymously, Published Feb. 18, 2011, IP.com No. IPCOM000204210D.

"System and method to automatically provide optimal content based on vision and eye movement", An IP.com Prior Art Database Technical Disclosure, Authors Disclosed Anonymously, Published Jun. 21, 2011, IP.com No. IPCOM000208045D.

\* cited by examiner

PREDICTING COMMUNITY DEVELOPMENT TRENDS

FIELD OF THE INVENTION

The present invention relates generally to the field of trend analysis, and more particularly to predicting community development.

BACKGROUND OF THE INVENTION

Community investment and planning requires balancing many variables to make a decision. Decisions of private investment, public investment, urban planning, and budgeting often depend on aggregating numerous data points to make informed inferences about long-term trends and/or valuations. Public goods, in particular, are difficult to value because they are intricately linked to a localized economy, which is dynamic in nature.

SUMMARY

In one aspect of the present invention, a method, a computer program product, and a system includes: extracting a first data set from a knowledge base, determining a first community rating based, at least in part, on the first data set, extracting a second data set from the knowledge base, determining a second community rating based, at least in part, on the second data set, and forecasting a third community rating based, at least in part, on the first and second community ratings. The first data set includes data related to a first attribute for a first time period. The second data set includes data related to a first attribute for a second time period.

DETAILED DESCRIPTION

Community development is supported by a community rating. Community ratings for various communities are compared to identify a preferred community. Historical community ratings are determined for the preferred community. Community rating trends are identified for the community and these trends are used for predicting future community rating(s) to support development decisions. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
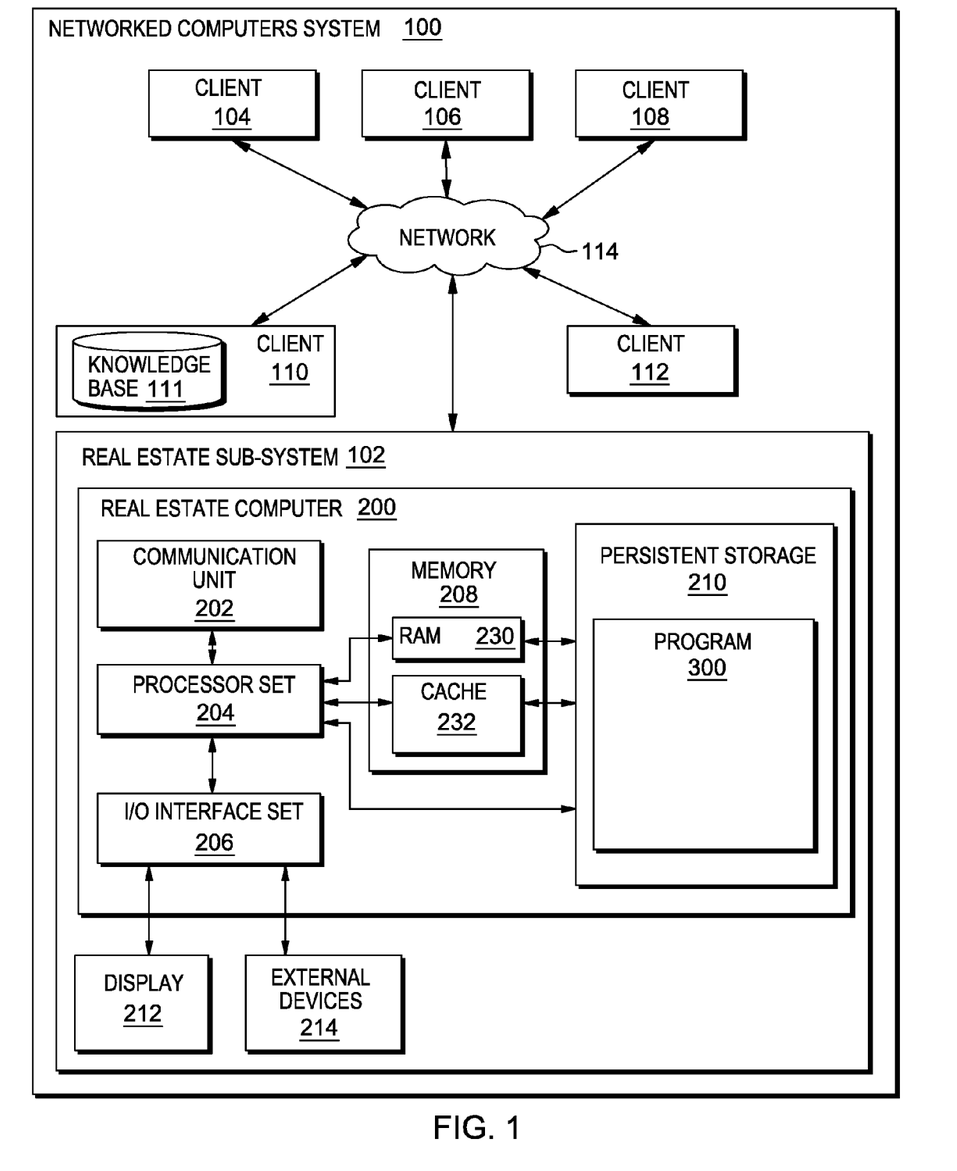
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: real estate sub-system 102; client sub-systems 104, 106, 108, 110, 112; knowledge base 111; communication network 114; real estate computer 200; communication unit 202; processor set 204; input/output (I/O) interface set 206; memory device 208; persistent storage device 210; display device 212; external device set 214; random access memory (RAM) devices 230; cache memory device 232; and program 300.

Real-estate sub-system 102 is, in many respects, representative of the various computer sub-system(s) in the present invention. Accordingly, several portions of real-estate sub-system will now be discussed in the following paragraphs.

Real-estate sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Real-estate sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Real-estate sub-system 102 is shown as a block diagram with many double arrows. These double arrows (no separate reference numerals) represent a communications fabric, which provides communications between various components of real-estate sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for real-estate sub-system 102; and/or (ii) devices external to real-estate sub-system 102 may be able to provide memory for real-estate sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to real-estate sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with real-estate computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Figure 3:
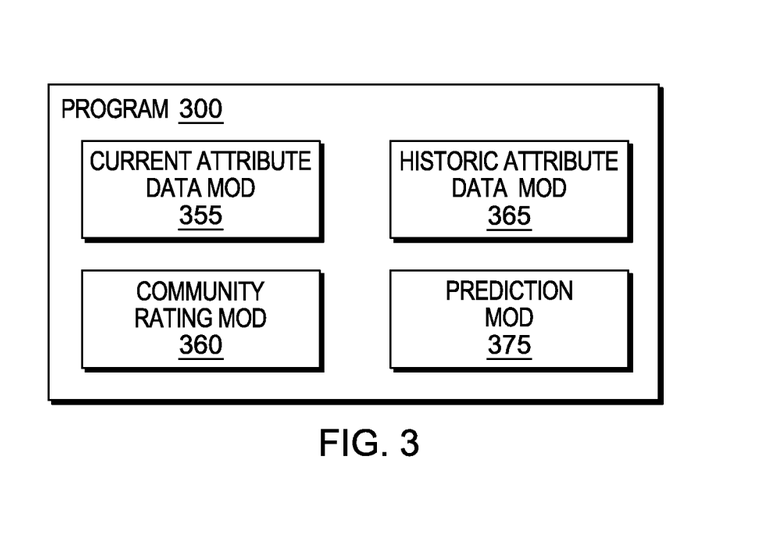
FIG. 3 is a schematic view of a machine logic (for example, software) portion of the first embodiment system.

Program 300 operates to access knowledge base 111 for attribute data and to determine a community rating based on the extracted attribute data. Further, community ratings for different time periods are determined for a given community and used for predicting a future community rating. The knowledge base may include data from one, or more, of the following resources: (i) online real-estate research website; (ii) social media postings; (iii) US census; (iv) standardized test performance; (v) school district statistics; (vi) map data points (e.g. municipal boundaries, school district boundaries, etc.); (vii) SAT score records; (viii) environmental records (US Environmental Protection Agency reports); (ix) disease information from, for example, the US Center for Disease Control; and/or (ix) public transportation data. The knowledge base may include data collected from free public access websites and/or subscription-based information services providing access to collected data.

Some embodiments of the present invention recognize the following facts, potential problems and/or potential areas for improvement with respect to the current state of the art: (i) it is often difficult for individuals to make assessments of the aggregate local effect of factors including: land value, public safety, and/or access to education; (ii) because these factors are difficult to consider simultaneously, individuals must resort to heuristic analysis; (iii) because considering the long-run trends as they relate to the local economy, individuals must resort to heuristic analysis; (iv) an analytical approach to making these decisions driven by local economic conditions in this context; (v) there is no comprehensive way of integrating various attribute data points into meaningful insights; and/or (vi) there is no comprehensive way of acting upon the long-run trends hidden in various attribute data.

Some embodiments of the present invention integrate prescriptive and predictive analytics along with an integrated model for applying user preferences to community investment provides a compelling way to: (i) find opportunities for investment; (ii) identify signs indicating a change of investment strategies; and/or (iii) spot trends before they happen.

The prescriptive analytical layer of the economic health score (EHS), also referred to herein as "community rating," and "home score," uses time series data to provide a relativized view of a community attribute. This functionality allows a user to compare trends in a variety of attributes of one community, or real estate location, including: (i) average home values; (ii) high school graduation rates; and/or (iii) crime rates with other communities. It allows the user to ask how a particular location, or community, is faring with respect to others. In this discussion, the term "community" should be taken quite broadly. That is, any given community is a group of people, property, and/or goods that may be associated with respect to a single economic health score. The size of a given community may vary greatly from a few individuals to entire nations or global segments.

The predictive analytical layer of the EHS analyzes historical trends in attribute changes to forecast future trends. By using this analytical layer, users can identify community attributes that are prone to change and exploit this information to make decisions about investment. It allows users to ask where one, or more, attributes are trending for a particular location, or community, so that a prediction may be made.

Figure 2:
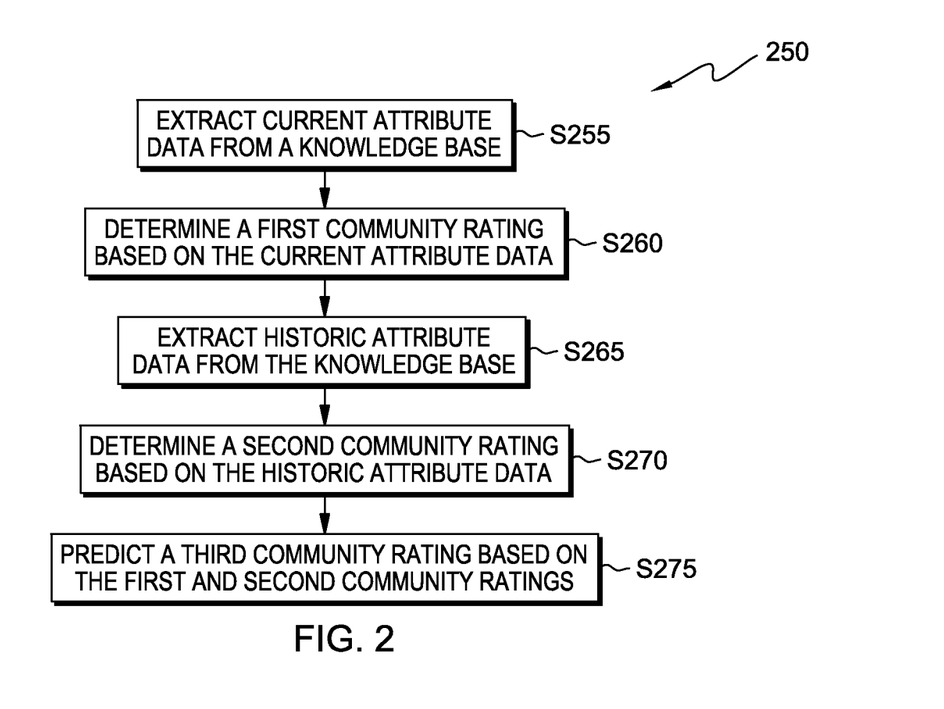
FIG. 2 is a flowchart showing a method performed, at least in part, by the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where current attribute data module 355 extracts current attribute data from knowledge base 111. Each community, however the scope of the term is defined, may be characterized by one, or more of the following attributes: (i) safety; (ii) physical health (access to health management facilities, available fresh food and water, local disease outbreaks); (iii) education; (iv) environment; (v) transportation; and/or (vi) affordability. The knowledge base is a collection of data that includes at least some information about an attribute for which a community may be characterized. To facilitate understanding of this disclosure, the following example is provided and will be discussed throughout the next several paragraphs. In this example, Home Buyer wants to locate a community according to the predicted status of the attribute of education. This is a simplistic example for illustration purposes. It is likely that a commercial embodiment of the present invention will provide for a user to have preferences associate with the future status of several attributes.

The future status of any given attribute may desirably improve, worsen, or remain static. In this example, Home Buyer wants to locate a community where the status of education will be improved for the next school year. Providing this information to Home Buyer begins, in this example, by extracting education data from knowledge base 111 for the most recent completed school year. As can be seen in this example, the term "current" may depend on the attribute and/or the stated objective of the user. That is, the "current" attribute data extracted from the knowledge base is for the most recent completed school year, while the historic data, discussed in more detail below, reflects data for school years preceding the "current" school year. In some embodiments of the present invention, the "current" school year is the most recent completed school year for which reporting is available. Some embodiments of the present invention tag data stored in the knowledge base with key information, such as "school year" for school statistics data. In that way, when a school-based search is performed, the data is extracted and organized according to the school year tag.

Processing proceeds to step S260, where community rating module 360 determines a first community rating based on the current attribute data extracted in step S255. For each community rating, there is a set of factors that are considered in determining the rating. Where multiple attributes are associated with a community score, each attribute has an "attribute score." These attribute scores are then combined to generate a single community rating. The discussion further below presents several factors for each of the six attributes presented above. For this discussion, several factors for the education attribute are discussed.

The selected data sets for education attribute factors may include: (i) distance to schools; (ii) graduation rates for local schools; (iii) independent school ratings; (iv) standardized test performance; (v) school bus route coverage; and/or (vi) number of public libraries. In this example, current education attribute data extracted from the knowledge base in step S255 includes standardized test performance and graduation rates for local schools. The most recent education factors for a first community indicate an 80% high school graduation rate (10% higher than a reference national average) and standardized tests performance is, on average, 10% higher than the national average. These insights about a chosen data points' relation to national averages are translated into an education attribute score in step S260, where a statistical normalization process translates differences in magnitude across data sets into a meaningful attribute score. This requires assigning interpretative magnitudes to each dataset. For example, smaller distances to schools could be considered positive, whereas smaller distances to landfills could be considered negative. An exemplary process follows: (i) the difference between specific data points and reference national averages is determined; (ii) these determined differences are adjusted to have either a directionally negative or positive interpretive influence; (iii) the determined differences are statistically normalized to be (a) "0" (negative influence), (b) "1" (neutral influence), or (c) "2" (positive influence); and (iv) the normalized values are then compared to determine the education factor subscore. In a more complex example, various neighborhoods may be considered and a preferred community may be identified, for example, according to the preference of the user. The weighting of attributes according to user preference is discussed in more detail below.

Having this education attribute data, community rating module 360 determines a corresponding first community rating. In this example, the community rating is scored on a 1-5 scale, with 5 being the best. This is a comparative score, so the rating is compared to some average, such as a national average or a neighboring community's average. With a score of 3 indicating an equality to a reference value, the first community score is 4, due to the slightly higher than average performance according to the available factors. Alternatively, the individual attribute scores are 0, 1, or 2, according to a Gaussian normalized distribution curve for the various factors associated with a given attribute. Further discussion of this alternative embodiment is found below. Other alternative embodiments provide the user with a representative ranking of the community with respect to a reference model.

Processing proceeds to step S265, where historic attribute data module 365 extracts historic attribute data from knowledge base 111. Continuing with the Home Buyer example above, the historic attribute module extracts any historic education attribute data from the knowledge base. In this example, historic education attribute data includes data from the school term immediately before the most recent completed school year (for which "current" data was extracted in step S255). The period of time representing the "historic attribute data" is not necessarily fixed, but may vary based on factors including: the objectives of the user; and/or the available time range for which attribute data is available. In this simple example, only one school year is being considered for gathering historic attribute data. In a commercial embodiment, several years of data are likely to be collected. Having more data points will better support the forecasting, or predicting, step that follows later in this discussion.

Processing proceeds to step S270, where community rating module 360 determines a second community rating based on the historic attribute data extracted in step S265. The second community rating may be determined as described above, for determining the education factor subscore. The selection of historical data sets in this step is configurable, for example, by the user, who chooses, for example: (i) the comparison timeperiod(s) according to preference and/or the availability of data. In this example, the second community rating is based on a single past school year. While some embodiments of the present invention would combine any additional past school years, if the data were available, some embodiments may determine a community rating for each past school year. For example, if four past years of education data were available, an embodiment of the present invention may determine, or generate, four individual community ratings for each year. For this example, the historic education attribute data extracted in step S265 includes standardized test performance, graduation rates for local schools, and independent school ratings. The community rating may be determined by combining the three factors available for the school year. However, in this example, because there was no independent school ratings data available for determining the first community rating, it will not be considered for determining the second community rating. It should be noted that alternative determination methods normalize disparate numbers and/or types of factors such that the exact factors accounted for in each rating is not tracked.

The historic educations factors indicate a 70% high school graduation rate (equal to a reference national average) and standardized tests performance is, on average, equal to the national average. Having this education attribute data, community rating module 360 determines a corresponding second community rating. In this example, the community rating is determined to be a 3, because the education attribute data indicates a rating equal to the national average.

Processing ends at step S275, where prediction module 375 predicts, or forecasts, a third community rating based on the first and second community ratings. The methods used to predict the third community rating vary, at least in part, according to the data set used. Essentially, a line of best fit is calculated based on a historical time series of scores to find a long-run trend. Extrapolating from this long-run trend would constitute a prediction of the third community rating. Statistical models for calculating the long-run trend line may include, but are not limited to: (i) linear; (ii) multivariate; (iii) logarithmic; (iv) exponential; (v) stochastic; and/or (vi) probabilistic. Continuing with the Home Buyer example, the prediction module identifies a year-to-year upward trend in community ratings. Accordingly, the prediction module forecasts that next year's community rating based on the education attribute will improve. Alternatively, the prediction module predicts an increase in the community rating, based on the education attribute, to 5, the highest rating. As noted earlier, this simple example is provide for illustration purposes. Commercial embodiments are likely to address numerous years and/or numerous attributes and may further address user preferences.

Further embodiments of the present invention are discussed in the paragraphs that follow and later with reference to FIGS. 4-8.

A use case is presented here where the EHS is referred to as the "home score," and the application is a real estate value estimator/predictor. Using big data to perform a multivariate best-fit analysis of user parameters addresses the challenges of considering many variables when forming heuristic judgments about real estate. By using existing free, public datasets, we can compile enough relevant data to create meaningful analysis of the real estate inventory of a major metropolitan area by: (i) bucketing specific attributes; (ii) creating both a means of considering many decision factors; and (iii) ensuring unbiased integrity of information. Some embodiments of the present invention provide a user customizable interface that matches a user's preferences for: (i) areas; (ii) neighborhoods; and/or (iii) individual listings. This is accomplished by categorizing properties using specified attributes.

Unstructured and structured data sets related to each category are selected, for example, by the user of the model, to derive their own meaningful insight into each community attribute, allowing users to select data sets that they feel are relevant. Users can assign data sets to categories as desired, to generate a subjective, thematic taxonomy of categories. Factors that have a direct effect on the safety sub-score may include, but are not limited to: (i) police presence; (ii) crime data; and/or (iii) fire data. Factors that have a direct effect on the health sub-score may include, but are not limited to: (i) ambulance response time; (ii) hospital grades; (iii) distance to hospitals; (iv) average hospital emergency room (ER) wait times; (v) ER success and discharge time; and/or (vi) the number of nearby health clinics. Factors that have a direct effect of the education sub-score may include, but are not limited to: (i) distance to schools; (ii) graduation rate; (iii) school ratings; (iv) standardized test scores; (iv) range of buses; and/or (v) the number of libraries. Factors that have a direct effect on the community sub-score may include, but are not limited to: (i) street noise; (ii) environmental data (including but not limited to: a) radon levels, b) $CO_2$ emissions, c) nearby garbage dump, d) nearby sewage treatment plant); (iii) homeless data; and/or (iv) proximity to local parks and recreation. Factors that have a direct effect on the transportation sub-score may include, but are not limited to: (i) average commute time; (ii) local road congestion; (iii) number of traffic accidents; (iv) proximity to public transportation (such as train, bus, and subway); (v) proximity to urban areas; and/or (v) nearby stores (such as grocery stores, malls, and drug stores). Factors that have a direct effect on the affordability sub-score may include, but are not limited to: (i) property price; (ii) historical home value trends; (iii) parking fees; (iv) co-op maintenance fees; (v) fee-listings; and/or (vi) home insurance premiums.

Some embodiments of the present invention apply a weight to the various attribute according to an algorithm. In that way, a single "home score" is created that represents a prediction of the user's satisfaction with the home. Neighborhoods, locations, or particular listings that are assigned higher home scores are better fits for the user. In this example, home scores may be generated for various communities, including: (i) boroughs; (ii) neighborhoods; (iii) blocks; (iv) buildings, and/or (v) specific dwelling units. User-selectable attributes for determining the home score include: (i) education; (ii) health; (iii) transportation; (iv) safety; (v) community; (vi) affordability; and/or (vii) other attribute(s) that might affect the economic health of a community.

The home score is the final, system-generated score that accounts for one, or more, of the user-selectable attributes: (i) safety; (ii) health; (iii) education; (iv) community; (v) transportation; and (vi) affordability. The various attributes that are assigned a sub-score are taken into account when the home score is generated. In this example, each of the attributes is assigned a sub-score for the purpose of generating a home score.

Continuing with the above real estate example, each neighborhood, zip code, and borough has its own, independent sub-score derived from a series of real time large structured and/or unstructured data extracted from public data sets made available through city governments, federal census reports, and/or public records. Structured data is extracted and analyzed through, for example, statistics software packages with techniques such as data mining, text analytics, and/or collaboration. These software packages are available commercially. Unstructured data is extracted, for example, through a cognitive-based machine-learning algorithm such as is employed by commercially available cognitive computing platforms.

Some embodiments of the present invention account for varying levels of accuracy, significance, and/or scope of attributes by weighting the home score value for a given attribute with a weighted algorithm. This process uses assigned weights to augment the effects of input variables on the final function output.

Six sub-scores for a corresponding six attributes are calculated as an independent and statistically significant holistic comparison to national averages for communities. In determining the attribute score, the specific average quantity of a given attribute and either an urban, suburban, or rural value for the national average quantity is taken into consideration. Each of the six sub-scores are a summation of statistical conclusions drawn from various related unstructured data sets, called attributes.

Figure 4:
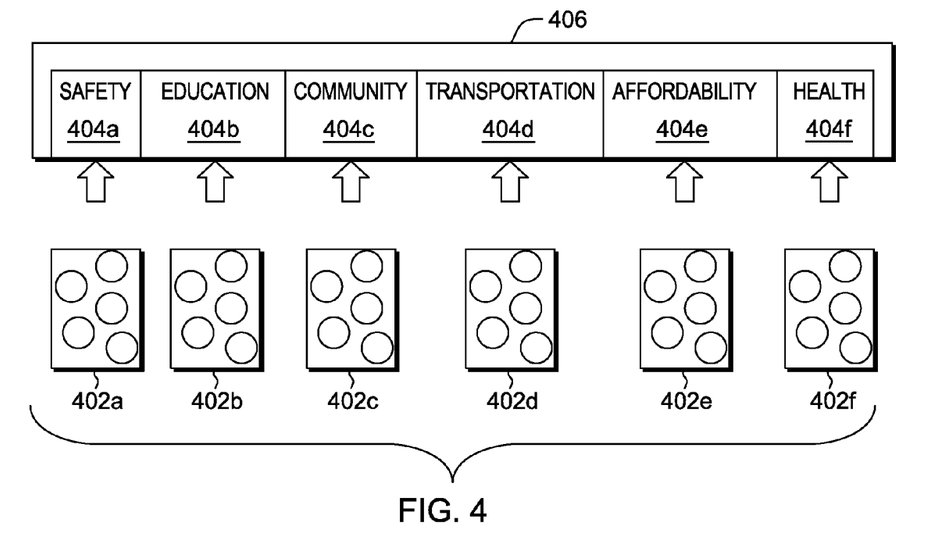
FIG. 4 is a system diagram showing data collection and processing according to an embodiment of the present invention.

FIG. 4 is a diagram illustrating the flow of structured and/or unstructured data, categorized by factors associated with corresponding attributes, safety 402*a*, education 402*b*, community 402*c*, transportation 402*d*, affordability 402*e*, and health 402*f*. The unstructured data is processed according to steps S255 and S260, above, to determine a score related to each identified factor. The scores for each factor are combined to generate an attribute score, safety 404a, education 404b, community 404c, transportation 404d, affordability 404e, and health 404f shown as elements of attribute score set 406.

The safety attribute represents a community's sense of security and safety. Factors that have an effect on the safety attribute may include: police presence, crime data, fire data, bed bug data, and/or drug abuse. Users who add multiplier points to this category place priority in the safety aspect of their prospective neighborhood and the weighted algorithm augments the safety attribute to have more emphasis in the EHS.

The health attribute represents a community's sense of wellness and welfare. Factors that have a direct effect on the health attribute could include: ambulance response time, hospital grades, distance to hospitals, average hospital ER wait times, ER success and discharge time, and number of nearby clinics. Users who add points to this category place priority in the health aspect of their prospective neighborhood and the weighted algorithm augments the health attribute to have more emphasis in the EHS.

The education attribute represents the quality of a community's education services. Factors that have a direct effect of the education attribute could include: distance to schools, graduation rate, school ratings, standardized test scores, range of buses, and number of libraries. Users who add points to this category place priority in the education aspect of their prospective neighborhood and the weighted algorithm augments the education attribute to have more emphasis in the EHS.

The community attribute represents a neighborhood's sense of community and friendliness. Factors that have a direct effect on the community attribute could include: street noise, environmental data (including but not limited to radon levels, CO2 emissions, nearby garbage dump, nearby sewage treatment plant), homeless data, and proximity to local parks and recreation. Users who add points to this category place priority in the community aspect of their prospective neighborhood and the weighted algorithm augments the community attribute to have more emphasis in the EHS.

The transportation attribute represents a neighborhood's ease of access and availability of local public transportation. Factors that have a direct effect on the transportation attribute could include: average commute time, local road congestion, number of road accidents, proximity to public transportation (train, bus, subway), proximity to urban areas, and nearby stores including grocery stores, malls, and drug stores. Users who add points to this category place priority in the transportation aspect of their prospective neighborhood and the weighted algorithm augments the transportation attribute to have more emphasis in the EHS.

The affordability attribute represents a neighborhood's cost of living. Factors that have a direct effect on the affordability attribute could include: property price, historical home value trends, parking fees, co-op maintenance fees, fee-listings, and insurance premiums. Users who add points to this category place priority in the affordability aspect of their prospective neighborhood and the weighted algorithm augments the affordability attribute to have more emphasis in the EHS.

Each attribute consists of one unstructured dataset that is associated with a single metric relating to the sub-score category. For example, average ambulance response time would be a metric that relates to the health sub-score category. A gaussian normalized probability distribution is performed for each unstructured data set to draw a statistical conclusion about that particular location's characteristic in question, called the attribute-score.

The attribute-score is a calculation beginning by subtracting the average metric in the specific location from the average metric in the specific location's region type, dividing by the standard deviation to standardize the values into z-scores. The z-score is a normalization of an attribute score, correcting for standard deviation in comparison with other variables. This allows all attribute-scores to be shown on the same scale. A representative formula combining normalized attribute-scores is written below:

$$f(x)=\alpha(\text{Health})+\beta(\text{Safety})+\gamma(\text{Education})+\epsilon(\text{Community})+\mu(\text{Transportation})+\rho(\text{Affordability}),$$

where: $f(x)$ is the combined attribute scores, and the terms $\alpha, \beta, \gamma, \epsilon, \mu,$ and $\rho$ each represent a weighting factor assigned to the associated attribute.

Due to their nature, some attribute factors are seen as positive influences for a property, such as higher-than-average standardized test scores, as that indicates a strong school district which would be a desirable characteristic for a neighborhood. On the other hand, other attribute factors are seen as negative influences for a property, such as higher-than-average crime rates. When calculating attribute sub-scores, the z-scores of factors that are seen as negative influences are taken as an absolute value to account for the fact that a lower-than-average statistic is preferred, while a factor that is seen as a positive influence on the attribute score is maintained as the raw value to account for the fact that a greater-than-average statistic is preferred. That is, each attribute factor is a positive or negative influence on its respective attribute. For example, the safety attribute factor of "bed bug data" is a negative influence on the safety attribute score, while "police presence" may be considered a positive influence on the safety attribute score. For another example, the transportation attribute factor of "commute time" is a negative influence on the transportation attribute score, while "proximity to public transportation" is a positive influence on the transportation attribute score.

Figure 5:
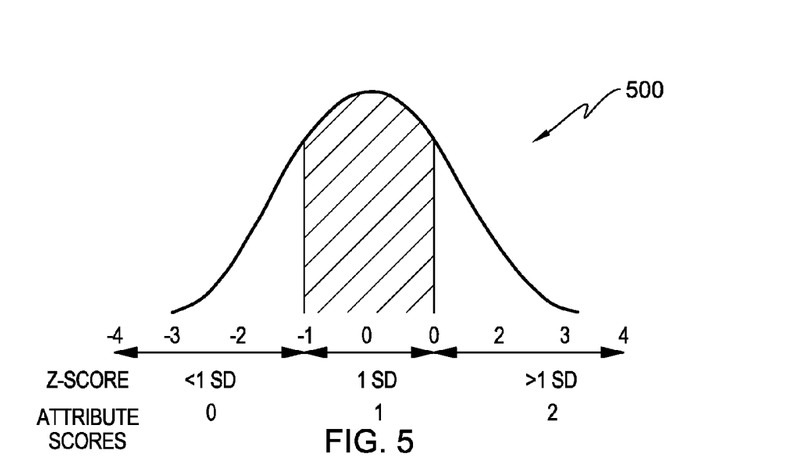
FIG. 5 is a chart showing an attribute rating scheme according to an embodiment of the present invention.

FIG. 5 is a chart depicting distribution 500 of z-scores according to one embodiment of the present invention. In this embodiment, the resulting z-scores are plotted on a Gaussian normalized distribution curve to be assigned discrete values of 0, 1, or 2 for the final attribute-score. Within 1 standard deviation from the mean, or a 68% confidence interval, the attribute-score is ranked a 1, representing an average result for the attribute when compared to peer locations. Less than 1 standard deviation from the mean signifies a less than desirable result for the attribute metric when compared to peer locations and the discrete value assigned is 0. Greater than 1 standard deviation from the mean signifies a desirable result for the attribute metric when compared to peer locations and the discrete value assigned is 2. The attribute-scores for each sub-score are then averaged together for a number between 0 and 2. A formula for determining the attribute score that may be plotted as shown in FIG. 5 is presented below:

$$f(x) = [0, 1, 2] = \frac{x^S - x^A}{\sigma},$$

where: $f(x)$ is the normalized attribute score; $x^S$ is the metric, specific location, $x^A$ is the metric, region type, and $\sigma$ is the standard deviation (SD). Further, where $f(x)=[0]=<(1SD)$; $f(x)=[1]=(\text{within } 1SD)$; and $f(x)=[2]=>(1SD)$. It is not necessary that a distribution curve be generated for the resulting z-scores. The distribution curve is shown for illustration purposes. It is, however, important that the various attribute scores being considered are "normalized" in some manner so that the scores may be compared one to another on the same scale, as stated above.

Figure 6:
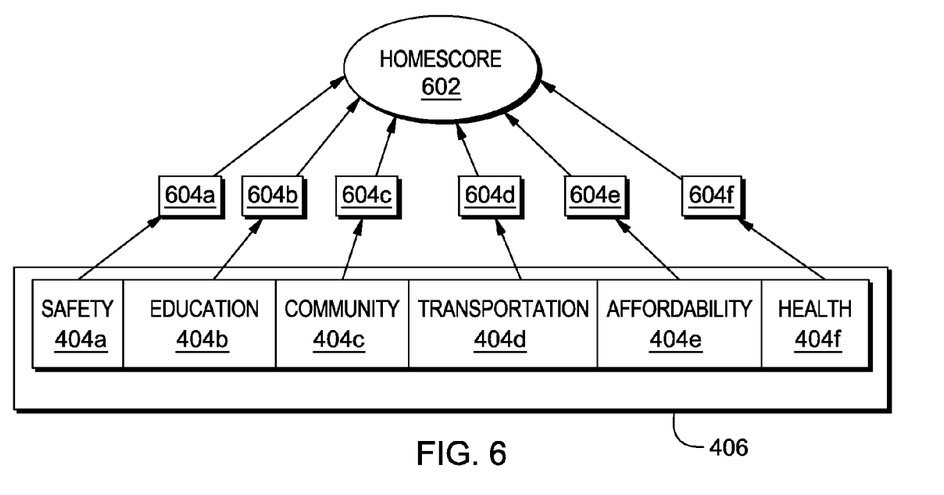
FIG. 6 is a system diagram showing the application of individual multipliers for a community rating according to an embodiment of the present invention.

FIG. 6 is a diagram illustrating incorporation of user-specified multipliers 604*a*, 604*b*, 604*c*, 604*d*, 604*e*, and 604*f* into the attribute score set 406, into homescore 602. As described above, each property has an individually determined and normalized value for each of the six attributes. To add the element of individualized preferences, each individual is given an allowance preference points to assign these six key attributes that they place personal value in when looking for a property. If a user strongly prefers one category, they can put multiple preference points on one attribute to increase the weighting of that attribute in the algorithm. In this example, up to 4 preference points can be placed on one sub-score category. Alternatively, available preference points depends on the number of attributes being considered. Alternatively, the maximum number of preference points is a pre-determined value according to user preference, corporate policy, or other reasoning.

These preference points are used in a normalized inverse Gaussian distribution for the sub-score preference multipliers for health, safety, education, community, transportation, and affordability as shown above. The default value for each of these multipliers is 1, with the complete calculation of these multipliers detailed below. With each preference point added to a sub-score, the multiplier increases by 1. The multiplier value would be between 1 (with a min of 0 preference points assigned) and 5 (with a max of 4 preference points assigned). Next an inverse normal cumulative distribution is run on each multiplier, which will yield a modified preference multiplier to normalize the allocation of an individual's preference points.

$$F^{-1}(y) = \inf_{x \in R} \{F(x) \geq y\}$$

Next, each individual sub-score is multiplied by its respective modified preference multiplier, resulting in an individualized sub-score for each property characteristic. The individualized sub-scores represent the individual utility curve of each property characteristic as they are an encapsulation of an individual's personal sense of value for that characteristic. The end result rolls up into one aggregate score, or home score, representing the individualized score that the neighborhood, zip code, or borough based off of user inputs.

Returning now to a general discussion, the methodology that follows describes an algorithm that extracts time-series analysis on the above-discussed data points. Some embodiments of the present invention provide an algorithm that allows for time-series analysis on the six key attributes discussed earlier with respect to a particular neighborhood, zip code, or borough according to publicly available data sets.

Figure 7:
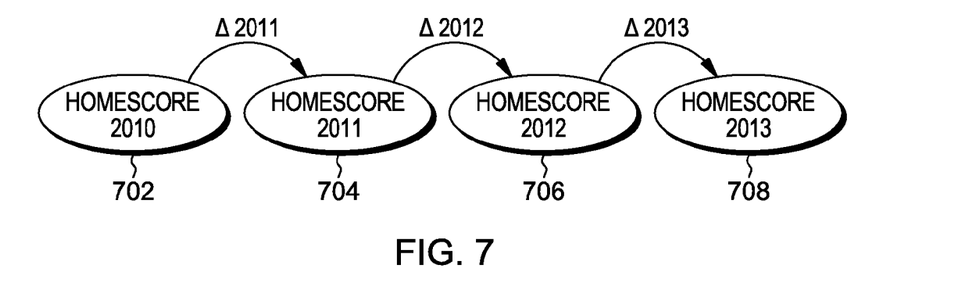
FIG. 7 is a diagram showing a retrospective community ratings according to an embodiment of the present invention.

FIG. 7 is a diagram illustrating the determination of changes, or deltas, from one historic score 702, 704, 706 to another historic score 704, 706, and to a current score 708. A retrospective time-series analysis of EHSs and sub-scores (transportation, health, education, community, safety, and affordability) allows for a look to see how a particular locale has been trending in terms of these six specific measures of economic welfare. A historical view of trends, comparing the past to the present, allows for a comprehensive look at the present status of a particular community's sub-scores and overall EHS. The model allows for a "performance review" of a community's sub-scores and EHSs, presenting the user with actionable information to augment the outcome of the next year's sub-scores and EHSs.

The algorithm's manipulation of the retrospective data allows for prescriptive analytics to be performed, yielding actionable information for both private and public sectors in the present time.

A location's EHS data from each year can be compared to find the difference, or delta, for example, between two home scores, as a calculation of:

$$\Delta'_{13-'10} = \frac{HomeScore_{2013} - HomeScore_{2010}}{HomeScore_{2010}}$$

Similarly, sub-scores can also be analyzed historically. Sub-score analysis yields a wealth of information for governments, private investors, and small/large local businesses. Governments can use this information to obtain status updates on new policies, ordinances, and initiatives such as youth curfews, educational policies, institution of new street lights, and countless other types of legislation. An insurance company can use the trend data to augment insurance premiums if a neighborhood is trending in terms of community, health, or safety. Private investors can glean information from a retrospective view of these Sub Scores to find a "diamond in the rough" and capitalize on trends in an area by expanding, contracting, or augmenting business policies with respect to the newly uncovered trends of the locale.

Individuals, on the other hand, can use retrospective Home Score analysis to see how a location's personal "desirability" is trending. This can be used by the individual to see if rent increases really are worth the extra cost to an individual.

Figure 8:
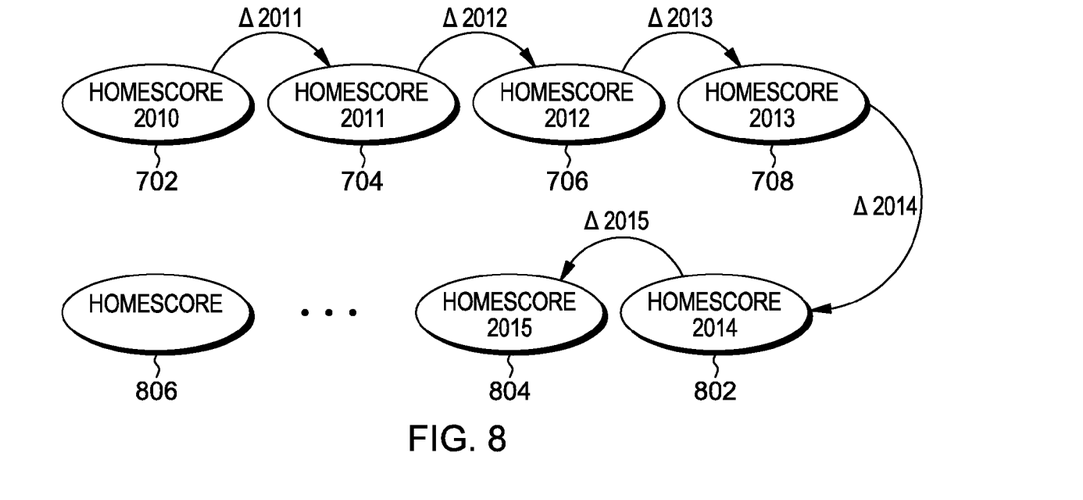
FIG. 8 is a diagram showing predictive community ratings based on retrospective community ratings according to an embodiment of the present invention.

FIG. 8 is a diagram illustrating the determination of changes, or deltas, from one historic score 702, 704, 706 to another historic score 704, 706, and to a current score 708, and further, predictions of changes from current score 708 to future score 802, and so forth with further predicted changes associated with future scores 804, 806. Predicting the future state of a community involves, as discussed in more detail above, the calculation of a long-run trend line and extrapolation. A prospective time-series analysis of EHSs and/or attribute scores introduces an extremely valuable component for the user, allowing the user to anticipate trends in a particular location's local economy. The prospective analytical modeling aspect of this methodology involves calculating a line-of-best-fit based on historical changes to find a long-run linear, multivariate, logarithmic, or exponential trend. Using a community's changes in EHS and/or attribute score year over year as data points, it is possible to predict the value of future changes in an EHS and/or attribute score based on this extrapolation of historical data.

Some embodiments of the present invention may include one, or more, of the following features, characteristics and/or advantages: (i) holistically assesses the trending value of public goods and/or property in a given community; (ii) provides retrospective analysis of value trends for public goods and/or property; (iii) provides prospective looking estimates of values for public goods and/or property; (iv) provides analysis of combined past and future community attributes; (v) uses prescriptive analytical tools to analyze past community attributes; (vi) uses prescriptive analytical tools to analyze future community attributes; (vii) uses predictive analytical tools to analyze past community attributes; (viii) uses predictive analytical tools to analyze future community attributes; (ix) provides governments with information to help craft more informed crime-fighting plans or adjusting education resources; (x) provides for private investors and/or homebuyers to identify misvalued property in the real estate market; (xi); provides for companies to make data-driven decisions about risk and asset value; (xii) visibility of both the current and future-trending value of community attributes; (xiii) reduces the complexity of multivariate analysis into a single economic health score (EHS) that can serve as a powerful decision aid for users; (xiv) provides the user with the ability to look further into the EHS to view a sub-score layer for each of the selected categories; (xv) uses free, publicly available data on urban areas from county, city, borough, state, and federal sources.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Attribute: any holistic descriptor of localized economic health, such as: (i) education; (ii) health; (iii) transportation; (iv) safety; (v) community; and (vi) affordability.

What is claimed is:

1. A method comprising:
   extracting a first data set from a knowledge base;
   determining a first community rating for a community based, at least in part, on the first data set;
   extracting a second data set from the knowledge base;
   determining a second community rating for the community based, at least in part, on the second data set; and
   forecasting a third community rating for the community based, at least in part, on the first and second community ratings;
   wherein:
   the knowledge base includes a collected data set from one of a free public access website and a subscription-based information service;
   the first community rating is representative of a current community data;
   the second community rating is representative of historical community data, where the historical community data includes historic attribute data for more than one attribute, and each of the more than one attributes characterizes the community;
   the third community rating is based on forecasted community data;
   the first data set includes data defining at least a first attribute for a first time period; and
   the second data set includes data defining to at least the first attribute for a second time period.

2. The method of claim 1 wherein the first attribute is one of the following attributes: safety, health, education, environment, community, transportation, and affordability.

3. The method of claim 1 wherein the first and second data sets include data defining two, or more, of the following attributes: safety, health, education, environment, community, transportation, and affordability.

4. The method of claim 1 wherein the community rating is based on a community that is a real estate location.

5. The method of claim 4 wherein the third community rating corresponds to a future value of the real estate location.

6. The method of claim 1 wherein the first time period is a current time period, and the second time period is a historical time period.

7. A computer program product comprising a computer readable storage medium having stored thereon:
   first program instructions programmed to extract a first data set from a knowledge base;
   second program instructions programmed to determine a first community rating for a community based, at least in part, on the first data set; and
   third program instructions programmed to extracting a second data set from the knowledge base;
   fourth program instructions programmed to determine a second community rating for the community based, at least in part, on the second data set; and
   fifth program instructions programmed to forecast a third community rating for the community based, at least in part, on the first and second community ratings;
   wherein:
   the knowledge base includes a collected data set from one of a free public access website and a subscription-based information service;
   the first community rating is representative of a current community data;
   the second community rating is representative of historical community data, where the historical community data includes historic attribute data for more than one attribute, and each of the more than one attributes characterizes the community;
   the third community rating is based on forecasted community data;
   the first data set includes data defining at least a first attribute for a first time period; and
   the second data set includes data defining at least the first attribute for a second time period.

8. The computer program product of claim 7 wherein the first attribute is one of the following attributes: safety, health, education, environment, community, transportation, and affordability.

9. The computer program product of claim 7 wherein the first and second data sets include data defining two, or more, of the following attributes: safety, health, education, environment, community, transportation, and affordability.

10. The computer program product of claim 7 wherein the community rating is based on a community that is a real estate location.

11. The computer program product of claim 10 wherein the third community rating corresponds to a future value of the real estate location.

12. The computer program product of claim 7 wherein the first time period is a current time period, and the second time period is a historical time period.

13. A computer system comprising:
a processor(s) set; and
a computer readable storage medium;
wherein:
the processor set is structured, located, connected, and/or programmed to run program instructions stored on the computer readable storage medium; and
the program instructions include:
first program instructions programmed to extract a first data set from a knowledge base;
second program instructions programmed to determine a first community rating for a community based, at least in part, on the first data set; and
third program instructions programmed to extracting a second data set from the knowledge base;
fourth program instructions programmed to determine a second community rating for the community based, at least in part, on the second data set; and
fifth program instructions programmed to forecast a third community rating for the community based, at least in part, on the first and second community ratings;
wherein:
the knowledge base includes a collected data set from one of a free public access website and a subscription-based information service;
the first community rating is representative of a current community data;
the second community rating is representative of historical community data, where the historical community data includes historic attribute data for more than one attribute, and each of the more than one attributes characterizes the community;
the third community rating is based on forecasted community data;
the first data set includes data defining at least a first attribute for a first time period; and
the second data set includes data defining at least the first attribute for a second time period.

14. The computer system of claim 13 wherein the first attribute is one of the following attributes: safety, health, education, environment, community, transportation, and affordability.

15. The computer system of claim 13 wherein the first and second data sets include data defining two, or more, of the following attributes: safety, health, education, environment, community, transportation, and affordability.

16. The computer system of claim 13 wherein the community rating is based on a community that is a real estate location.

17. The computer system of claim 16 wherein the third community rating corresponds to a future value of the real estate location.

18. The computer system of claim 13 wherein the first time period is a current time period, and the second time period is a historical time period.

* * * * *